(12) United States Patent
Webster et al.

(10) Patent No.: US 9,274,275 B2
(45) Date of Patent: Mar. 1, 2016

(54) PHOTONIC INTEGRATION PLATFORM

(71) Applicant: Cisco Technology, Inc., San Jose, CA (US)

(72) Inventors: Mark Webster, Bethlehem, PA (US); Ravi Sekhar Tummidi, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 13/935,277

(22) Filed: Jul. 3, 2013

(65) Prior Publication Data
US 2015/0010266 A1    Jan. 8, 2015

(51) Int. Cl.
| | |
|---|---|
| *G02B 6/12* | (2006.01) |
| *G02B 6/122* | (2006.01) |
| *G02B 6/30* | (2006.01) |
| *G02B 6/132* | (2006.01) |
| *G02B 6/10* | (2006.01) |
| *G02B 6/43* | (2006.01) |

(52) U.S. Cl.
CPC *G02B 6/122* (2013.01); *G02B 6/12* (2013.01); *G02B 6/1228* (2013.01); *G02B 6/305* (2013.01); *G02B 6/107* (2013.01); *G02B 6/12002* (2013.01); *G02B 6/132* (2013.01); *G02B 6/43* (2013.01); *G02B 2006/12038* (2013.01); *G02B 2006/12061* (2013.01); *G02B 2006/12147* (2013.01); *G02B 2006/12152* (2013.01)

(58) Field of Classification Search
CPC .................................. G02B 6/12; G02B 6/122
USPC .................................................... 385/14, 16
See application file for complete search history.

(56) References Cited

U.S. PATENT DOCUMENTS

| | | | | |
|---|---|---|---|---|
| 5,841,931 | A * | 11/1998 | Foresi et al. .................. | 385/131 |
| 7,260,293 | B1 * | 8/2007 | Gunn et al. ..................... | 385/37 |
| 8,625,939 | B1 * | 1/2014 | Rakich ............................ | 385/27 |
| 2003/0059190 | A1 * | 3/2003 | Gunn et al. ................... | 385/130 |
| 2003/0068152 | A1 * | 4/2003 | Gunn, III ...................... | 385/129 |
| 2010/0246617 | A1 * | 9/2010 | Jones .............................. | 372/26 |
| 2011/0069730 | A1 * | 3/2011 | Strittmatter et al. ........ | 372/45.01 |
| 2011/0073989 | A1 * | 3/2011 | Rong et al. .................... | 257/532 |

(Continued)

FOREIGN PATENT DOCUMENTS

WO    2014/047443 A1    3/2014

OTHER PUBLICATIONS

Jared F Bauters et al: "Integration of ultra-low-loss silica waveguides with silicon photonics", Photonics Conference (IPC), 2012 IEEE, Sep. 23, 2012, pp. 701-702.

(Continued)

*Primary Examiner* — Kaveh C Kianni
(74) *Attorney, Agent, or Firm* — Patterson & Sheridan, LLP

(57) ABSTRACT

A SOI device may include a waveguide adapter that couples light between an external light source—e.g., a fiber optic cable or laser—and a silicon waveguide on the silicon surface layer of the SOI device. In one embodiment, the waveguide adapter is embedded into the insulator layer. Doing so may enable the waveguide adapter to be formed before the surface layer components are added onto the SOI device. Accordingly, fabrication techniques that use high-temperatures may be used without harming other components in the SOI device—e.g., the waveguide adapter is formed before heat-sensitive components are added to the silicon surface layer.

7 Claims, 8 Drawing Sheets

(56) References Cited

U.S. PATENT DOCUMENTS

2013/0142476 A1* 6/2013 Dallesasse et al. ............ 385/11
2014/0153600 A1* 6/2014 Luo et al. ........................ 372/40

OTHER PUBLICATIONS

Hu Y C et al: "Expanded-core channel waveguides: Single-mode analysis and application", Optics Communications, North-Holland Publishing Co., Amsterdam, NL, vol. 281, No. 15-16, Aug. 1, 2008, pp. 3980-3984.
International Search Report for PCT/US2014/042941, Oct. 14, 2014.
Bauters, Jared F. et al., Silicon on ultra-low-loss waveguide photonic integration platform, Optics Info Base, Jan. 7, 2013, pp. 544-555, vol. 21, Issue 1, Washington, DC, United States.
Hatori, Nobuaki et al., A Novel Spot Size Convertor for Hybrid Integrated Light Sources on Photonics-Electronics Convergence System, 9th International Conference on Group IV Photonics, Aug. 2012, pp. 171-173, IEEE, Piscataway, United States.
De Ridder, Rene M. et al., Silicon Oxynitride Planar Waveguiding Structures for Application in Optical Communication, IEEE Journal of Selected Topics in Quantum Electronics, Dec. 1998, pp. 930-937, vol. 4, Issue 6, Piscataway, United States.
Sun, Rong et al., Impedance matching vertical optical waveguide couplers for dense high index contrast circuits, Optics Info Base, Jul. 21, 2008, pp. 11682-11690, vol. 16, Issue 16, Washington, DC, United States.
Worhoff, Kerstin, et al., Design, Tolerance Analysis, and Fabrication of Silicon Oxynitride Based Planar Optical Waveguides for Communication Devices, Journal of Lightwave Technology, Aug. 1999, pp. 1401-1407, vol. 17, Issue 8, Piscataway, United States.
Bruel, M. Silicon on insulator material technology, Electronics Letters, Jul. 6, 1995, vol. 31, No. 14, pp. 1201-1202, Piscataway, United States.

* cited by examiner

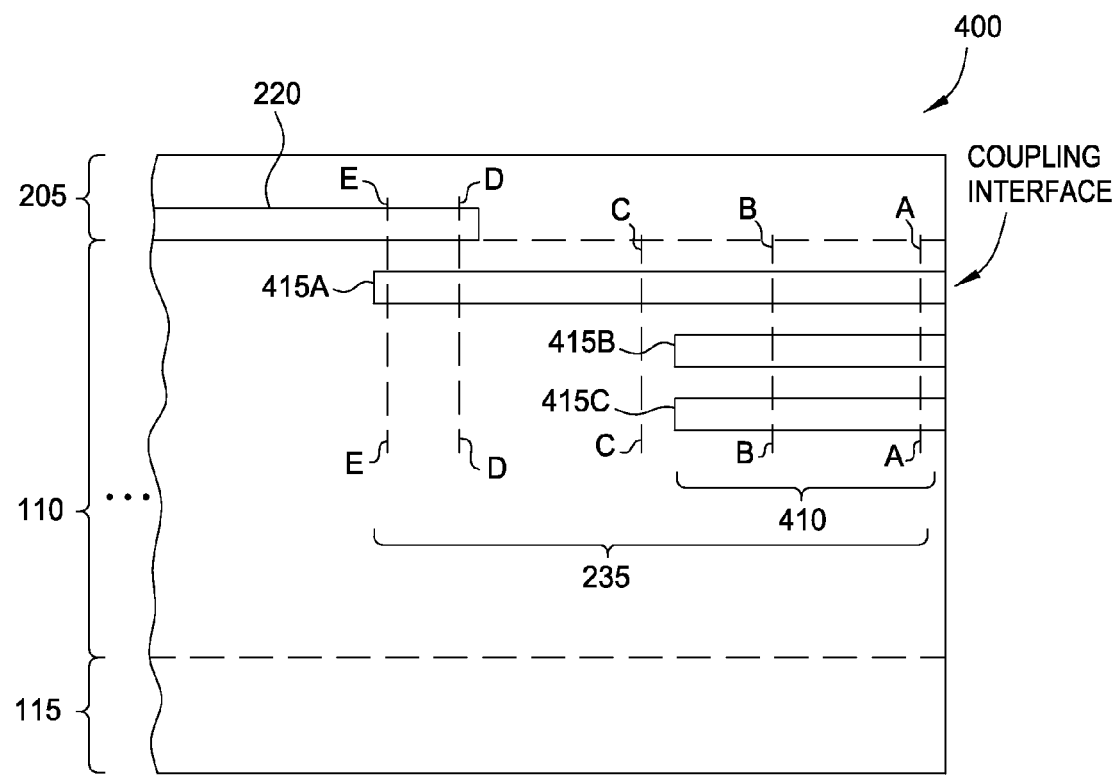
FIG. 4
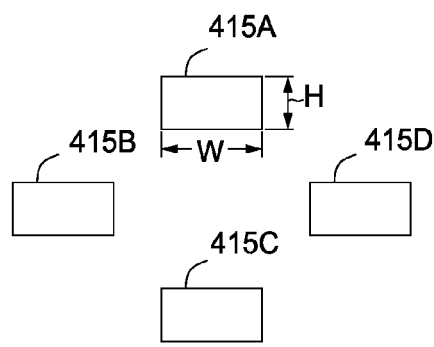 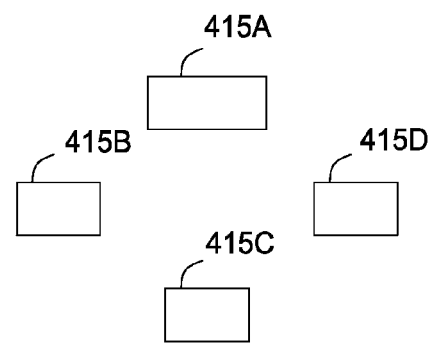
FIG. 5A    FIG. 5B

PHOTONIC INTEGRATION PLATFORM

TECHNICAL FIELD

Embodiments presented in this disclosure generally relate to waveguides in a silicon-on-insulator (SOI) device, and more specifically, to embedding waveguides in the insulator layer of the SOI device.

BACKGROUND

SOI optical devices may include an active surface layer that includes waveguides, optical modulators, detectors, CMOS circuitry, metal leads for interfacing with external semiconductor chips, and the like. Transmitting optical signals from and to this active surface layer introduces many challenges. For example, a fiber optic cable may be attached to the SOI optical device and interface with a waveguide on its surface layer; however, the diameter of the one or more modes of the optic cable (e.g., approximately 10 microns for a single-mode cable) may have a much different size than the mode of a sub-micron dimensioned waveguide tasked with routing the optical signal in the SOI device. Accordingly, directly interfacing the fiber optic cable with the sub-micron waveguide may result in low transmission efficiency or high coupling loss.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates a side view of a SOI device with a multi-prong, embedded waveguide, according to one embodiment disclosed herein.

FIGS. 5A-5E illustrate cross-sectional views of the SOI device with the multi-prong embedded waveguide, according to embodiments disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION

Overview

Figure 1:
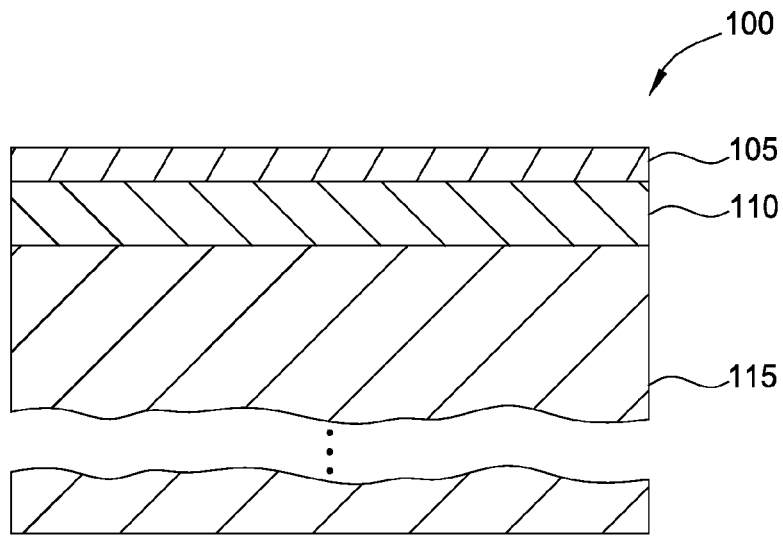
FIG. 1 illustrates a SOI device, according to one embodiment disclosed herein.

One embodiment of the present disclosure includes a method for forming an optical device comprising a substrate and an insulation layer. The method includes forming a first waveguide in the insulation layer of the optical device and, after forming the first waveguide, disposing a crystalline semiconductor layer on top of the insulation layer. The method includes forming a second waveguide in the semiconductor layer where the second waveguide overlaps the first waveguide in the insulation layer.

Another embodiment of the present disclosure includes a silicon-on-insulator (SOI) optical device. The device includes a semiconductor substrate and an insulation layer disposed above the substrate where the insulation layer includes an embedded waveguide. The device further includes a crystalline silicon layer above the insulation layer where the silicon layer includes a silicon waveguide that overlaps the embedded waveguide such that an optical signal transmitted in the embedded waveguide is transferred to the silicon waveguide in the silicon layer.

Another embodiment of the present disclosure includes an optical system that includes a SOI device. The SOI device includes a semiconductor substrate and an insulation layer disposed above the substrate where the insulation layer includes an embedded waveguide. The device further includes a crystalline silicon layer above the insulation layer where the silicon layer includes a silicon waveguide that overlaps the embedded waveguide such that an optical signal transmitted in the embedded waveguide is transferred to the silicon waveguide in the silicon layer. The optical system also includes an external light source disposed at the external coupling surface where the external light source is configured to introduce an optical signal into the embedded waveguide at the external coupling surface.

Another embodiment of the present disclosure is an optical waveguide that includes a first prong and a plurality of second prongs where the first prong and second prongs are configured to at least one of receive and transmit optical energy via a coupling surface of an optical device. Furthermore, a dimension of the second prongs reduces as the second prongs extend in a direction away from the coupling surface and a dimension of the first prong increases as the first prong extends away from the coupling surface. In addition, a length of the first prong in the direction extending away from the coupling surface is greater than each of the respective lengths of the second prongs.

DESCRIPTION OF EXAMPLE EMBODIMENTS

A silicon-on-insulator (SOI) device may include a waveguide adapter that couples an external light source—e.g., light from a fiber optic cable or a laser directly coupled to the SOI device—to a silicon waveguide on a surface layer of the SOI device. The waveguide adapter may improve transmission efficiency relative to directly coupling the light source to the waveguide. In one embodiment, the waveguide adapter may also be located on the same surface layer as the waveguide. For example, the waveguide adapter may include several layers, which may have varying concentrations of dopants or different materials shaped to focus the received optical signal into the waveguide. However, fabricating the waveguide adapter on the surface layer of the SOI device may impose constraints on the techniques and materials that are used to form the waveguide adapter. For example, the surface layer may include components that are made using CMOS fabrication techniques. Many of these components however, are sensitive to temperature. For example, if metal is deposited onto the surface layer, the temperature of the SOI device may not be able to exceed 300-400 degrees Celsius or the metal may migrate and cause a defect (e.g., a short circuit) in the SOI device. Accordingly, if the waveguide adapter contained other deposited materials that needed to be annealed to achieve low-loss operation, the SOI device could not be subjected to high-annealing temperatures (e.g., 1000 degrees Celsius) without potentially harming other components in the surface layer of the SOI device.

Instead, in one embodiment, the waveguide adapter is embedded into the insulation layer of the SOI device. Doing so may enable the waveguide adapter to be formed before the surface layer components are added to the SOI device. Accordingly, fabrication techniques that use high-temperatures may be used to form a low loss waveguide adapter with high optical power throughput without harming other components in the SOI device—e.g., the waveguide adapter is formed before heat-sensitive components are added to the silicon surface layer. In one embodiment, the waveguide adapter is formed on the device even before the silicon surface layer of the SOI device is formed. That is, the adapter may be disposed on the SOI device when the device only includes a semiconductor substrate and an insulation layer. After the waveguide adapter is embedded into the insulation layer, the silicon surface layer may be added onto the insulation layer to form a SOI structure.

FIG. 1 illustrates a SOI device 100, according to one embodiment disclosed herein. SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such. For example, other semiconductors or optically transmissive materials may be used to form the structure 100 shown here. Moreover, the surface 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. As will be discussed in greater detail below, the thickness of the insulation layer 110 may directly depend on the size of the mode being coupled to the SOI device 100 and the desired efficiency. As such, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the silicon surface layer 105 and insulation layer 110 (e.g., silicon dioxide, silicon oxynitride, and the like) may provide contrasting refractive indexes that confine an optical signal in a waveguide in the surface layer 105. In a later processing step, the surface layer 105 of the SOI device 100 may be etched to form one or more silicon waveguides. Because silicon has a higher refractive index compared to an insulator such as silicon dioxide, the optical signal remains primarily in the waveguide as it propagates across the surface layer 105.

Figure 2:
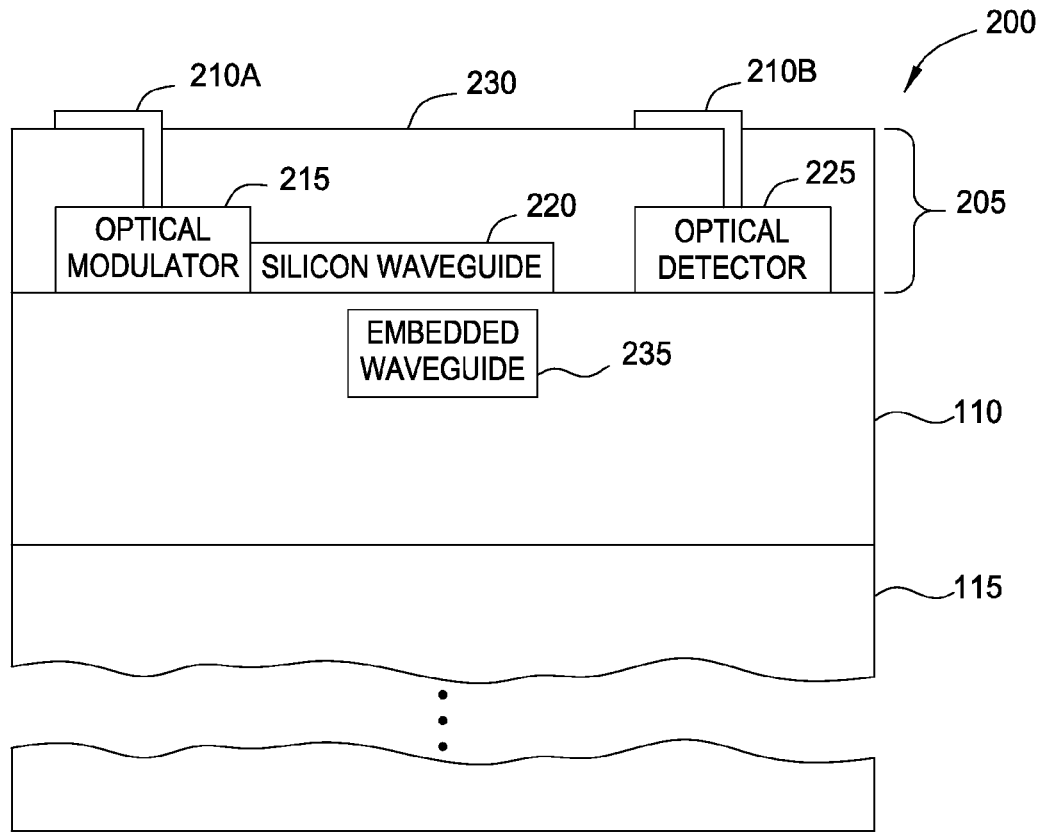
FIG. 2 illustrates a SOI device with an embedded waveguide, according to one embodiment disclosed herein.

FIG. 2 illustrates a SOI device 200 with an embedded waveguide, according to one embodiment disclosed herein. Like the SOI device 100 in FIG. 1, SOI device 200 includes a top surface layer 205, insulation layer 110, and substrate 115. However, the surface layer 205 has been processed to include various optical components that may be used in an optical device. For example, surface layer 205 includes an optical modulator 215 which include a metal lead 210A. The modulator 215 may have been formed by performing various fabrication steps on the silicon layer such as etching or doping the silicon material as well as depositing additional materials onto surface layer 205. The metal lead 210A may be used to transmit a data signal that controls the optical modulator 215. For example, the optical modulator 215 may be a CMOS capacitor including n-type and p-type doped regions coupled to respective metal leads for changing the phase of the optical signal passing through the modulator 215. Although not shown, the metal leads may be connected to an integrated circuit mounted onto the SOI device 200 that provides the one or more data signals that control the modulator 215. In another embodiment, the integrated circuit may be physically separate from the SOI device 200 but couple to the metal leads through bond wires.

Like the optical modulator 215, the silicon waveguide 220 may have been fabricated from the silicon surface layer (e.g., layer 105 of FIG. 1). SOI device 200 may use waveguide 220 to carry the optical signal to different areas of the surface layer 205. For example, an input of optical modulator 215 may receive an optical signal via waveguide 220, modulate the signal, and transmit the resulting signal along a different waveguide coupled to an output of the optical modulator 215.

In addition to including components made from silicon, surface layer 205 includes optical detector 225 which may be made from other materials (e.g., optical detector 225 may be a geranium detector) or a combination of silicon with other materials. The other materials may be deposited on surface layer 205 using any suitable deposition technique. For example, in one embodiment, surface layer 205 may be processed to include an optical light source (not shown). The light source (e.g., a monolithic light source in silicon or a source made from other materials and bonded onto surface layer 105) may directly couple to one of the silicon waveguide 220 for carrying light emitted from the light source to other components in the SOI device 200. Once the surface layer 205 is processed to include the desired components, the components may be covered with a protective material 230 (e.g., an electrical insulative material) which may serve as a suitable base for mounting additional circuitry on the SOI device 200. In this manner, the silicon surface layer 205 of SOI device 200 may be processed using any number of techniques to form a device for performing a particular application such as optical modulation, detection, amplification, generating an optical signal, and the like.

Insulation layer 110 includes at least one embedded waveguide 235. In one embodiment, the embedded waveguide 235 includes a waveguide adapter that enables the SOI device 200 to couple an optical signal to an optical fiber and/or receive an optical signal from a light source external to the device 200. Further still, the embedded waveguide 235 may be shaped such that the optical signal traveling in it transfers to the silicon waveguide 220. As will be discussed later, an optical fiber may couple to SOI device 200 in order to transmit an optical signal into the embedded waveguide 235. The optical signal propagates along the embedded waveguide 235 until the signal reaches a portion of waveguide 235 designed to transfer the optical signal to the silicon waveguide 220 in the surface layer 205. Once transferred, the silicon waveguide 220 may carry the optical signal to the various components in the surface layer 205. For example, silicon waveguide 220 may pass the optical signal into the optical modulator 215 where the signal is modulated and then passed to a different silicon waveguide (not shown). Further, the silicon waveguide may transfer the modulated signal into another waveguide embedded in the insulation layer 110 which terminates at another optical fiber that carries the modulated signal away from the SOI device 200. In this manner, the embedded waveguides 235 may be used to receive or transmit an optical signal or to route optical signals between different optical components in the device layer 205.

The waveguide adapters in the embedded waveguides 235 may be designed to efficiently couple to external light sources. As explained above, because the dimensions of the silicon waveguide 220 may result in high optical losses if directly connected to an external light source, the light source may instead be coupled to the embedded waveguide 235 which then transfers the signal into the silicon waveguide 220. Placing the embedded waveguides 235 in the insulation layer 110 increase the flexibility of the parameters used to design the embedded waveguide. For example, the thickness of the insulation layer 110 is easily increased in order to accommodate a larger embedded waveguide 235. Moreover, because the insulation layer 110 is primarily unused, waveguides in this layer may have less routing constraints—e.g., less crowding.

Furthermore, in one embodiment, the embedded waveguide 235 may be formed on the SOI device 200 before the various components in surface layer 205 are added. Because forming the embedded waveguide 235 may require high temperatures to achieve low loss material films, these temperatures may affect the components in the surface layer 205. For example, high temperatures (e.g., greater than 400 degrees Celsius) may cause the metal leads 210A and 210B to migrate or change the dopant concentrations in the optical modulator 215 or optical detector 225. Thus, the embedded waveguide 235 may be disposed on the insulation layer using high-temperature fabrication steps before the optical components are disposed on the device 200.

Although the embodiments below describe forming the waveguide 235 before forming or depositing any optical components onto the upper layer 205/310A, the present disclosure is not limited to such. That is, in one embodiment, the waveguide 235 may be formed after (or contemporaneously with) components formed on the surface layer 205. For example, silicon waveguide 220 may not be affected by the high temperatures used to form the embedded waveguide 235, and thus, the embedded waveguide 235 may be formed after or while the silicon waveguide 220 is etched into the surface layer 205. Nonetheless, the waveguide 235 may be formed before any heat-sensitive components are formed on the surface layer 205—e.g., metal leads 210—that would be affected by the high temperatures used to form the embedded waveguide 235.

Figure 3:
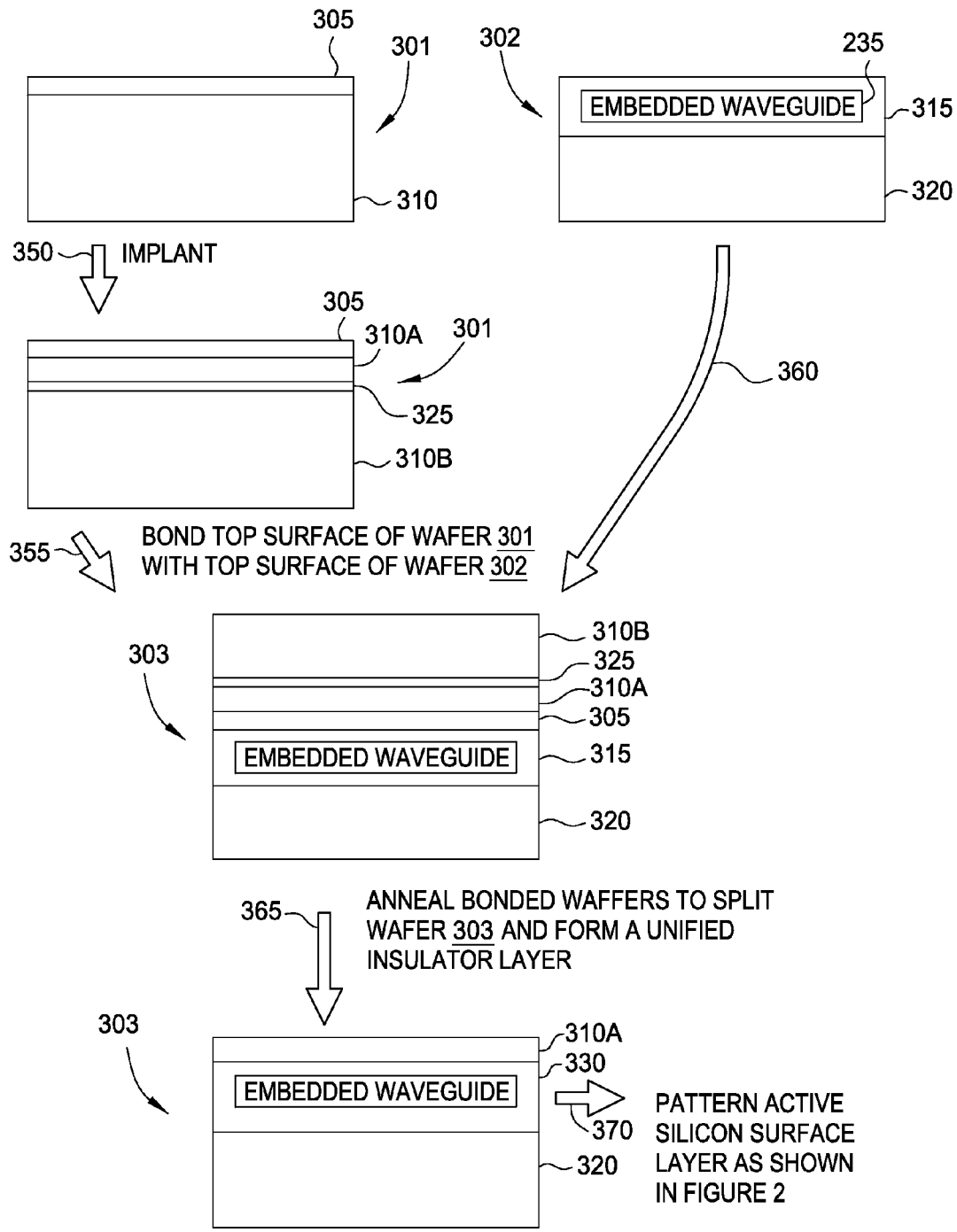
FIG. 3 illustrates a flow chart for fabricating a SOI device with the embedded waveguide, according to one embodiment disclosed herein.

FIG. 3 illustrates a flow chart 300 for fabricating a SOI device with the embedded waveguide, according to one embodiment disclosed herein. Wafer 301 includes a substrate 310 with an insulation layer 305. In one embodiment, the substrate 310 may be a semiconductor material while insulation layer 305 is an insulator such as silicon oxide, silicon rich oxide, silicon oxynitride, or other insulative material. Arrow 350 illustrates that wafer 301 is implanted with a dopant (e.g., hydrogen) in order to weaken the crystalline structure of the semiconductor substrate 310. As shown, the dopant forms an impurity layer 325 which may be used in a later processing step to divide the semiconductor substrate 310 into an upper portion 310A and lower portion 310B.

Arrows 355 and 360 represent bonding wafer 301 with a separate wafer 302. Specifically, the insulating layer 305 of wafer 301 is bonded to an insulating layer 315 of wafer 302. The insulating layer 315 of wafer 302 includes one or more embedded waveguides 235 as discussed in FIG. 2. Although FIG. 3 illustrates that the embedded waveguide 235 is recessed a certain distance (e.g., around 100 nanometers) from the top surface of wafer 302, in other embodiments, the embedded waveguide 235 may be exposed on the top surface of wafer 302. The fabrication of the embedded waveguide 235 in wafer 302 will be discussed in greater detail later. Wafer 302 also includes a substrate 320 which may be a semiconductor (e.g., silicon). In one embodiment, the insulation layer 315 may be composed of a material based on the semiconductor material of the substrate 320—e.g., if the substrate 320 is silicon, the insulation layer 315 may be silicon dioxide or silicon oxynitride.

Wafers 301 and 302 are bonded to form wafer 303 where the wafers are bonded at the respective insulation layers 305 and 315. Here, wafer 301 is shown as being upside down and on top of wafer 302. The process shown in FIG. 3 is not limited to any particular technique for bonding the wafers.

Arrow 365 illustrates annealing wafer 303 which causes the impurity layer 325 to split the substrate 310 into the upper and lower portions 310A and 310B. Moreover, annealing may cause the two insulation layers 305 and 315 to form a unitary insulation layer 330. In this embodiment, the insulation layers 305 and 315 may be made of the same material. Moreover, the insulation layer 305 may be thinner than the insulation layer 315.

The lower portion 310B may then be removed while the upper portion 310A forms the silicon surface layer of an SOI structure. In some embodiment, the upper portion 310A may be thinned using a chemical-mechanical polishing to achieve the desired thickness (e.g., typically 50-300 nanometers) and planarity. In this manner, wafer 303 includes a SOI structure with a top layer (e.g., upper portion 310A) that includes a crystalline semiconductor, an insulation layer (e.g., the unitary insulation layer 330), and a crystalline semiconductor substrate 320. Furthermore, the SOI structure of wafer 303 includes an embedded waveguide 235 that was formed prior to forming optical components in the top layer 310A of wafer 303.

Arrow 370 represents that further processing may be performed to add the optical components onto the top layer of the SOI structure. For example, upper portion 310A may then be processed as shown in FIG. 2 to include optical modulators 215, waveguides 220, optical detectors 225, optical light sources, and the like. Because the embedded waveguides 235 were formed previously, these components may use CMOS techniques or other temperature-sensitive fabrication techniques without limiting the materials or techniques used when fabricating the embedded waveguides 235.

FIG. 4 illustrates a side view of a SOI device 400 with a multi-prong, embedded waveguide 235, according to one embodiment disclosed herein. Here, surface layer 205 includes a silicon waveguide 220. Although not shown, the silicon waveguide 220 may navigate the surface layer 205 to couple an optical signal to various optical components in the surface layer 205. The dotted line illustrates the division between the surface layer 205 and the insulation layer 110.

The insulation layer 110 includes the embedded waveguide 235. Here, the embedded waveguide 235 also includes a waveguide adapter 410 which abuts—i.e., is exposed on—a coupling interface of the SOI device. However, although not shown, the embedded waveguide 235 may be recessed (e.g., 1-5 microns) from the coupling interface. This interface may be used by an external optical component (e.g., optical fiber or a laser) to transmit light into or receive light from the embedded waveguide 235. Thus, the coupling interface may be an external facing surface of the SOI device 400. Here, the embedded waveguide 235 is made of separate prongs 415 that may include the same material (e.g., silicon nitride or silicon oxynitride) embedded in the insulation material of layer 110 (e.g., silicon dioxide or silicon oxynitride). In one embodiment, the material of the prongs 415 and embedded waveguide 235 may be different from the material of layer 110. Generally, the embedded waveguide 235 may be made of any material with a higher refractive index than the material of the insulation layer 110.

Figure 5C:
Figure 5C:

FIGS. 5A-5E illustrate cross-sectional views of the SOI device with the multi-prong embedded waveguide, according to embodiments disclosed herein. Specifically, FIG. 5A illustrates the cross section A-A of a portion of the waveguide adapter 410 that is closest to the coupling interface. Here, the waveguide adapter 410 includes four separate prongs 415A-D that may have the same or similar width (W) and height (H) (or thickness) dimensions. These dimensions, as well as the spacing between the prongs 415A-D may vary depending on the specific application. In the example shown, the waveguide adapter 410 may be configured to interface with a single mode optical fiber with a 10 micron core. As will be appreciated by one of ordinary skill in the art, these dimensions may vary depending on the specific application. Specifically, the dimensions may be chosen such that the mode of the prong at the coupling interface substantially matches the mode of the external device to which light is to be coupled to or from. Here, the width of the prongs 415A-D may range from approximately 200-300 nanometers with a height between 100-150 nanometers. More specifically, the width may be around 250 nanometers while the height is approximately 120 nanometers. The distance between prong 415A and prong 415C and the distance between prong 415D and prong 415B may be around two microns. As mentioned above, the dimensions, as well as the spacing, of the prongs 415 may vary according to the mode or design of the external light source coupled to the SOI device.

FIG. 5B illustrates the cross section B-B of the waveguide adapter 410. This figure shows that as the multi-prong adapter is recessed away from the coupling interface, the width of the prongs 415B, 415C, and 415D reduces while the width of prong 415A, which is closest to the interface between the insulation layer 110 and surface layer 205, increases. As shown, the tapering of widths of the prongs 415B-D is done in an adiabatic fashion. The tapering results in a gradual transition of optical energy from an optical mode which is confined by all the prongs 415A-D at or near the coupling interface where the widths and heights of all the prongs 415A-D are same to a mode which is gradually confined more and more in the upper prong 415A at positions farther away from the coupling interface. This tapering transfers the optical energy confined by prongs 415A-D to prong 415A alone. However, the opposite is also true. That is, tapering the widths also enables a signal introduced in the upper prong 415A to be transferred to a mode confined by prongs 415A-D as the optical signal propagates towards the coupling interface. The widths of the prongs 415A-D may change continuously (e.g., a linear or non-linear fashion such as exponentially or at higher order polynomial profiles) or at discrete increments as the waveguide adapter 410 extends away from the coupling interface. As shown in FIG. 4, eventually the prongs 415B-D terminate (which ends the waveguide adapter 410) while prong 415A continues to transmit the optical signal. In one embodiment, the waveguide adapter 410 may extend for approximately 100 microns from the coupling interface before the adapter 410 terminates. Furthermore, the waveguide adapter 410 may taper for all of this length or for only a portion thereof. For example, the widths of the prongs 415A-D may remain substantially equivalent for the first five to ten microns before the widths of prongs 415A-D begin to change.

FIG. 5C illustrates the cross section C-C of the embedded waveguide 235. Here, the waveguide adapter 410 has terminated which leaves only prong 415A to carry the optical signal through the insulation layer 110. Although shown as being linear, prong 415A may bend or twist to carry the optical signal to different areas of the SOI device 400. Thus, the length of prong 415A may be much larger than the lengths of prongs 415B-D to enable prong 415A to carry an optical signal to different areas of the SOI device 400.

Figure 5D:

FIG. 5D illustrates the cross section D-D of the embedded waveguide 235 and silicon waveguide 220. As shown, the width of prong 415A is larger than the width of the silicon waveguide 220 in the surface layer 205. Moreover, the distance between prong 415A and the waveguide 220 may range from hundreds of nanometers to only a few nanometers depending on the techniques used to fabricate the SOI device 400. Depending on the technique used to fabricate the SOI device 400, a portion of prong 415A may directly contact waveguide 220.

Figure 5E:
Figure 5E:
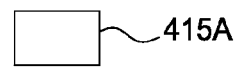

FIG. 5E illustrates the cross section E-E of the embedded waveguide 235 and silicon waveguide 220. Here, the width of prong 415A has shrunk while the width of the waveguide 220 has increased. This tapering, which is again shown in an adiabatic fashion, results in the optical signal in prong 415A to transfer to waveguide 220 and vice versa with minimal loss. Eventually, prong 415A terminates and waveguide 220 may carry the optical signal to different optical components located on surface layer 205.

The embedded waveguide may also be used to transfer an optical signal from the surface layer 205 to the coupling interface and onto an external optical transmission device such as a fiber optic cable. Here, the optical signal propagates along the waveguide 220 until the signal reaches a portion of the SOI device 400 where the waveguide 220 overlaps prong 415A. The tapering design transfers the optical signal from waveguide 220 to prong 415A. Before reaching the coupling interface, prong 415A begins to narrow which gradually transfers the optical energy into a mode which is confined by the four prongs 415A-D. At the coupling interfaces, the prongs 415A-D combine to transmit the optical signal into the external optical transmission device—e.g., an optical fiber.

Although the embodiments above discuss tapering the prongs 415A-D by changing the width, a similar transfer of optical power may occur if the heights are tapered, or some combination of both. However, tapering the height of the prongs 415A-D may require different lithography and fabrication techniques or materials than tapering the widths as shown in FIGS. 5A-5E.

Although the present embodiments discuss forming the embedded waveguide in the insulation layer 110, this disclosure is not limited to such. It is explicitly contemplated that the embedded waveguide may be placed at or above the surface layer 205 of the SOI device 400 even if the other components in the surface layer 205 prevent using high-temperatures when forming the embedded waveguide 235 and waveguide adapter 410. For example, the multi-prong adapter 410 may be made from materials that do not require high-temperatures during fabrication, and thus, may be deposited after heat-sensitive components have been formed on the surface layer 205.

Figure 6A:
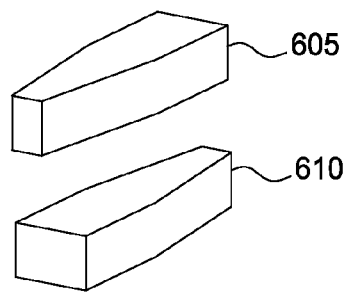
FIGS. 6A-6B illustrate an overlapping waveguide structure for transferring an optical signal between waveguides, according to embodiments disclosed herein.
Figure 6B:
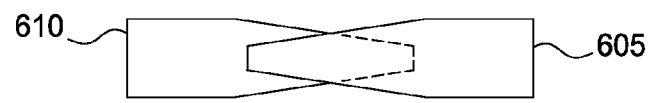

FIGS. 6A-6B illustrate a partially overlapping, inverse-taper waveguide structure for transferring an optical signal between waveguides, according to embodiments disclosed herein. As shown, FIG. 6A illustrates a plan view of a first tapered waveguide 605 partially overlapping a second tapered waveguide 610. Specifically, FIG. 6A may be the arrangement of the portion of SOI device 400 in FIG. 4 where waveguide 220 overlaps prong 415A. The tapering of the waveguides is done adiabatically to minimize optical loss. Although FIGS. 6A and 6B illustrate that the widths of the tapers vary linearly, the waveguides can also tape in a non-linear fashion for example exponential or some higher order polynomial profile as long as the adiabatic criterion is satisfied. In one embodiment the distance between the first and second waveguides 605 and 610 is less than a micron. For example, the waveguides 605, 610 may be separated by 100 nanometers or less. The separation distance may affect the efficiency at which an optical signal may transfer between the waveguides 605 and 610, and thus, an SOI structure may be designed such that the waveguides 605 and 610 are as close as fabrication techniques allow.

FIG. 6B illustrate a top view of waveguides 605 and 610. By at least partially overlapping the waveguides 605, 610, an optical signal may be transferred from a waveguide embedded in the insulation layer (e.g., the first tapered waveguide 610) to a waveguide in the active surface layer (e.g., the second tapered waveguide 605) of the SOI device. In one embodiment, the waveguides 605, 610 only partially overlap where their respective ends begin to taper. The slope or change of the taper may depend on the material used for forming the waveguides 605, 610. In one embodiment, at the widest point, the waveguides 605, 610 may have a width that ranges from 200 nanometers to 2 microns. At the narrowest point, the waveguides 605, 610 may have a width from 100 nanometers to 200 nanometers. The length of the tapering portion may be in the range from 10 microns to 50 microns—e.g., around 20 micros.

Figure 7:
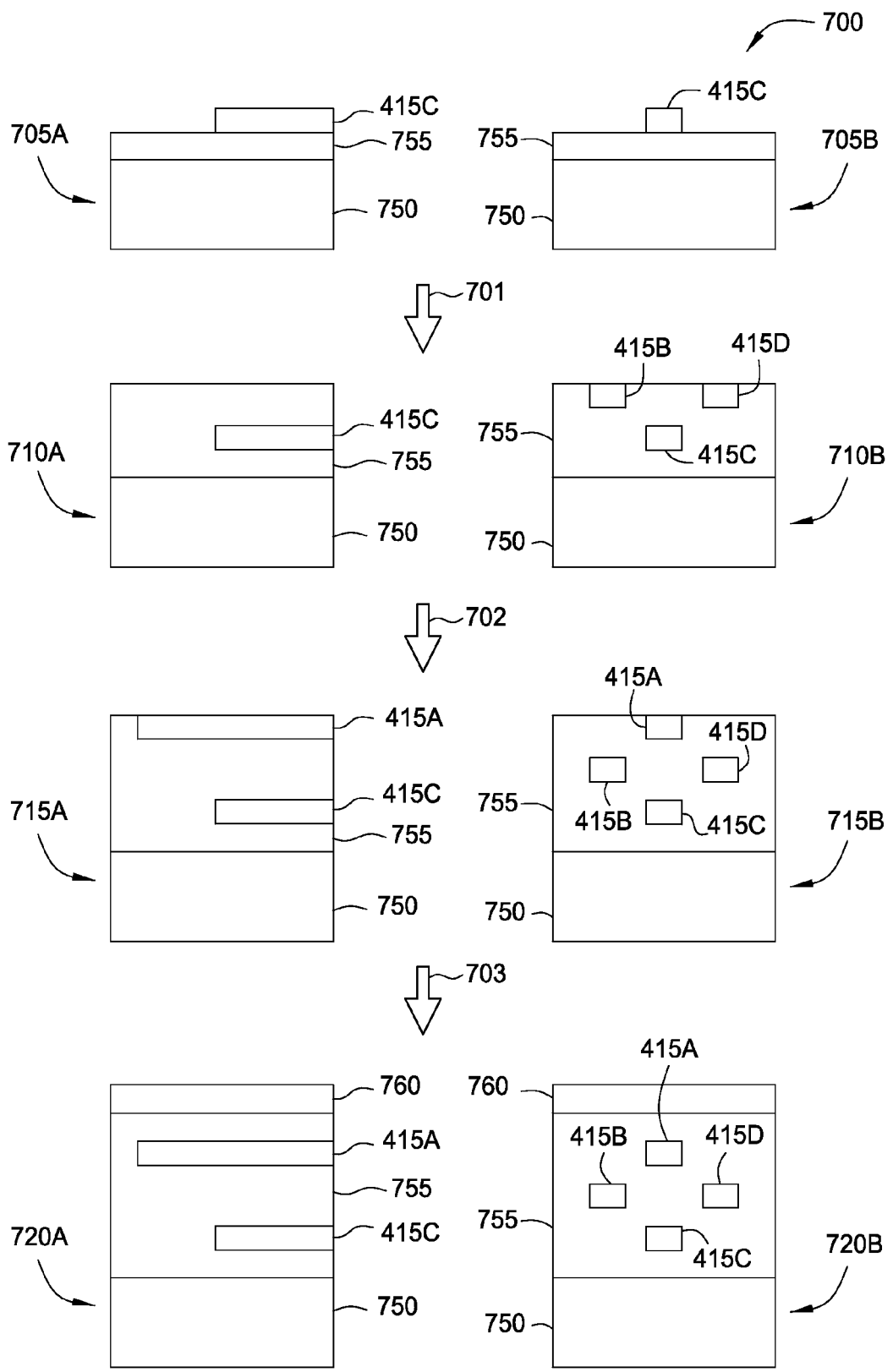
FIG. 7 illustrates a flow for fabricating the multi-prong, embedded waveguide, according to one embodiment disclosed herein.

FIG. 7 illustrates a flow 700 for fabricating the multi-prong, embedded waveguide, according to one embodiment disclosed herein. Specifically, the flow 700 illustrates fabricating the waveguide adapter shown in FIG. 4 which may be used to interface with an external light source. The right column of flow 700 illustrates a front view of the multi-prong waveguide adapter while the left column illustrates a cross section of the middle of the front view. In one embodiment, flow 700 may occur prior to fabrication process shown in FIG. 3. For example, flow 700 may be used to fabricate the embedded waveguide 235 in wafer 302 in FIG. 3.

Side view 705A illustrates a semiconductor substrate 750 supporting an insulation layer 755 with prong 415C (i.e., the bottom most prong of the waveguide adapter 410 shown in FIG. 4) deposited on top. Prong 415C may be made of any suitable waveguide material that can be deposited on top on insulator 755 and patterned using lithography and etching techniques. For example, prong 415C may be composed of a material with a higher refractive index than the refractive index of the material of the insulation layer 755. In one embodiment, the prong 415C (and the other prongs of the embedded waveguide) may be made of silicon oxynitride or silicon nitride while the insulation layer 755 is silicon dioxide or silicon oxynitride. For example, prongs 415 may be silicon oxynitride while the insulation layer 755 is silicon dioxide or the prongs 415 may be silicon nitride while the insulation layer 755 is either silicon oxynitride or silicon dioxide.

Front view 705B illustrates that prong 415C may be deposited and arranged (e.g., etched) at a specific location on the insulation layer 755. In one embodiment, front view 705B shows the coupling interface used by the SOI device to connect to an external light source. In other processing steps (not shown), the substrate 750 may be formed to enable the external light source to abut the coupling interface.

Arrow 701 illustrates forming the rightmost and leftmost prongs 415B and 415D on the wafer. Specifically, side view 710A illustrates that additional insulation material may be added to layer 755. Front view 710B shows that prongs 415B and 415D may be deposited and formed to have the spacing corresponding to the desired application of the SOI device. As discussed above, the spacing may depend on the type of optical signal being coupled into or out of the coupling interface. For example, the dimensions or number of prongs may vary depending on the mode size of the optical signal.

Arrow 702 illustrates forming the top prong 415A of the embedded waveguide. As shown by side view 715A, prong 415A may extend further from the coupling interface than prongs 415B-D. Although shown as being linear, prong 415A may have any number of turns that enable prong 415A to carry an optical signal to different portions of the SOI device. Front view 715B illustrates a multi-prong adapter similar to the one shown in FIG. 4. When forming the prongs 415A-D, flow 700 is not limited to any particular fabrication techniques. That is, prongs 415A-D may be formed using high-temperature annealing steps that would not otherwise be permitted if temperature sensitive materials or structure were already deposited on the SOI device.

Arrow 703 illustrates forming a crystalline semiconductor top layer 760 to complete the SOI structure. In one embodiment, the top layer 760 may be formed using the wafer splitting process shown in FIG. 3. The semiconductor layer 760 may then be processed to form waveguides, optical modulators, optical detectors, optical sources and the like as shown in FIG. 2. In order to introduce optical signals into the SOI structure, front view 720B illustrates a coupling interface where an optical fiber or laser may transmit an optical signal into the prongs 415A-D of the embedded waveguide. Side view 720A illustrates the upper prong 415A may extend past the lower prongs 415B-D in order to carry the optical signal to a location where the optical signal may be transferred to a waveguide in the upper layer 760.

Figure 8:
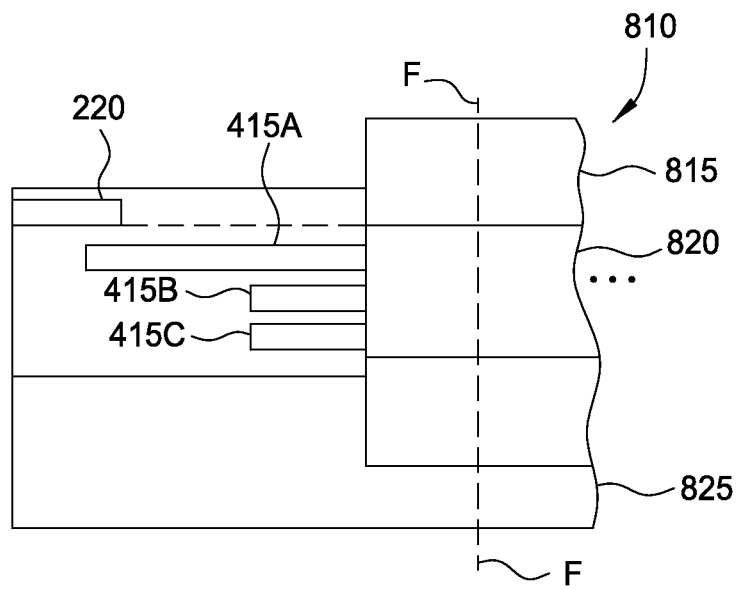
FIG. 8 illustrates an optical system with a fiber optic cable coupled to an embedded waveguide, according to one embodiment disclosed herein.

FIG. 8 illustrates an optical system with a fiber optic cable 810 coupled to an embedded waveguide, according to one embodiment disclosed herein. Although FIG. 8 illustrates coupling a cable 810 to a SOI device, the same arrangement may be used to couple other light sources (e.g., a laser) to the SOI device. Here, a core 820 of the optical cable 810 is aligned to the prongs 415 of the adapter. That is, core 820 may be centered with respect to prongs 415A-D in order to introduce the optical signal into the embedded waveguide. Although the core 820 is shown as being substantially parallel with the prongs 415A-D, in one embodiment, the features may be angled (e.g., 5-20 degrees) which may reduce reflections.

FIG. 8 illustrates that a cladding 815 of the optic cable 810 rests on a surface of the substrate 825. In one embodiment, the optical cable 810 may be attached to the substrate 825 using an epoxy or other type of connective resin. In another embodiment, however, the cladding 815 may be removed. In this example, the SOI device may be designed such that core 820 rests on the substrate 825.

Figure 9:
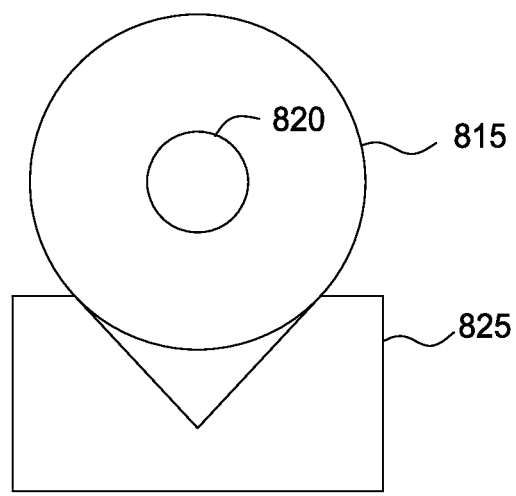
FIG. 9 illustrates a cross sectional view of the optical system, of FIG. 8 according to one embodiment disclosed herein.

FIG. 9 illustrates a cross sectional view of the optical system in FIG. 8, according to one embodiment disclosed herein. Specifically, FIG. 9 is a cross section of F-F which shows that the substrate 825 is designed with a V-groove to passively align the core 820 and cladding 815 of the optical fiber 810 to the prongs 415A-D of the waveguide adapter. Before attaching the optical fiber 810 to the SOI device, substrate 825 may be anistropically etched along a plane of the semiconductor substrate 825 to form a V-groove. By using the V-groove, actively aligning the optical fiber to the waveguide adapter in the insulation layer may either be avoided or made substantially easier. Although a V shaped groove is shown, in other embodiments the groove may be rectangular or trapezoidal.

In one embodiment, the optical system shown in FIGS. 8 and 9 may be replicated to facilitate an array of optic cables 810 that attach to the substrate 825 at the coupling interface. For example, the substrate 825 may be etched to form a plurality of V-grooves that each align with a respective set of prongs 415A-D at a shared coupling interface. A different optical cable 810 may then be placed in each of the grooves which aligns the cable 810 with one of the sets of prongs 415A-D. In another embodiment, a groove in substrate 825 may be used to align an optical cable 810 with a plurality of cores 820 such that each of the cores 820 aligns with a respective set of prongs 415A-D.

Figure 10:
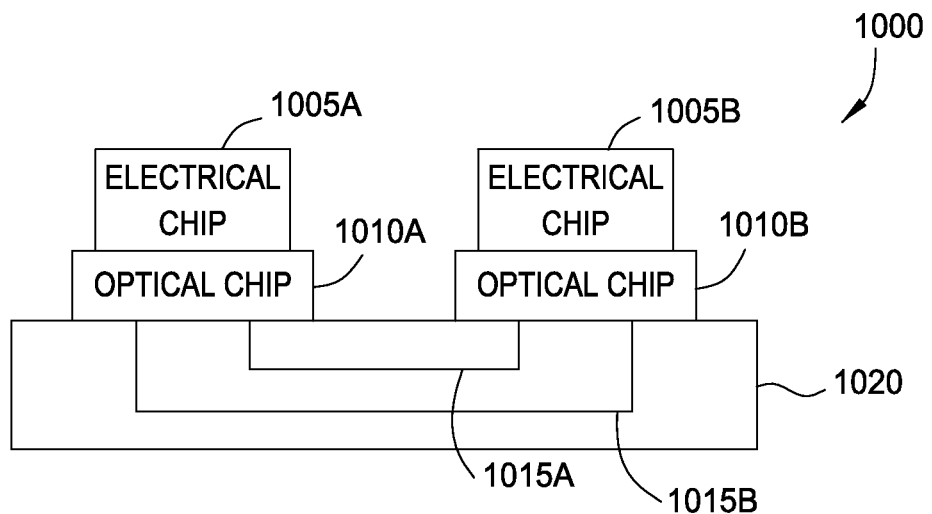
FIG. 10 illustrates an electro/optical device, according to one embodiment disclosed herein.

FIG. 10 illustrates an electro/optical device 1000, according to one embodiment disclosed herein. Specifically, FIG. 10 illustrates using optical chips 1010A and 1010B as interposers between the electrical chips 1005A and 1005B. The electrical chips 1005A, 1005B (e.g. CMOS chips) may provide electrical data signals to the optical chips 1010A, 1010B that, for example, control optical modulation being performed in the optical chips 1010A, 1010B. Furthermore, the electrical chips 1005A, 1005B may communicate with each other by sending electrical signals to the optical chips 1010A, 1010B which convert the electrical signal into optical signals that are then transmitted using waveguides 1015A, 1015B. Once the optical signal reaches its destination, the optical signal is reconverted into an electrical signal and is transmitted to the electrical chip 1005.

Figure 11:
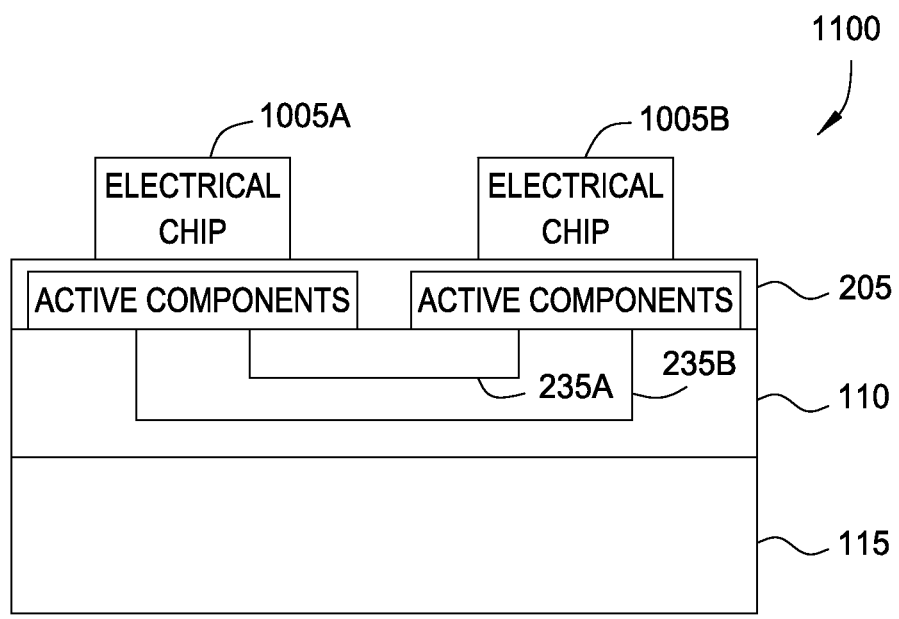
FIG. 11 illustrates the electro/optical device with embedded waveguides, according to one embodiment disclosed herein.

FIG. 11 illustrates the electro/optical device 1100 with embedded waveguides, according to one embodiment disclosed herein. Here, the interposer layer shown in FIG. 10 (i.e., the optical chips 1010A, 1010B) may be replaced by the SOI device disclosed herein. The electrical chips 1005A, 1005B may be attached to the top surface of the surface layer 205. The surface layer 205 may include leads that allow chips 1005A, 1005B to transmit and receive electrical signals from the active components in the surface layer 205—i.e., optical modulators, optical/electrical signal converters, detectors, etc. For example, the electrical chips 1005A, 1005B may communicate by transmitting an electrical signal to an electric/optical converter in the surface layer 205 which converts the electrical signal into an optical signal and transmits the converted optical signal through the embedded waveguides 235A and 235B. When transmitting optical signals between electrical chips 1005A and 1005B, the embedded waveguides may use prong 415A shown in FIG. 4 which interfaces with respective waveguides in the surface layer 205 using the tapered configuration shown in FIG. 6A. In other embodiments, the electro/optical device 1100 may include other embedded waveguides that may transmit or receive optical signals from external light sources. These waveguides may include the waveguide adapter 410 shown in FIG. 4 to improve the transmission efficiency with the external light source.

Advantageously, using the waveguides 235A-B embedded in the insulation layer 110 help with waveguide routing congestion. Instead of relying only on waveguides in the surface layer 205, the embedded waveguides 235A-B provide an additional routing layer for transmitting data between the electrical chips 1005A and 1005B. Furthermore, using the tapered structure shown in FIG. 6 to optically couple waveguides in the surface layer 205 with the embedded waveguides 235A-B removes inefficiencies from transmitting the optical signal from the optical chips 1010A and 1010B into the waveguides 1015A and 1015B as shown in FIG. 10. The optical coupling takes place between lithographically defined features in the embodiment shown in FIG. 11 and hence is very tight and accurate. Optical coupling between optical chips 1010A, 1010B and underlying waveguides 1015A, 1015A shown in the embodiment depicted in FIG. 10 might have to be achieved using post waveguide fabrication active alignment techniques which might not be accurate and requires significant overhead.

Figure 12A:
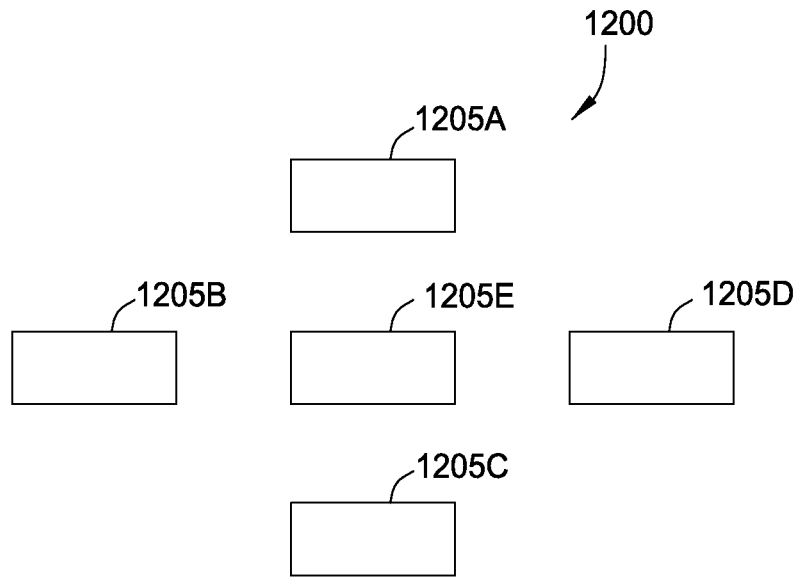
FIGS. 12A-12B illustrate cross-sectional views of the SOI device with the multi-prong embedded waveguide, according to embodiments disclosed herein.
Figure 12B:
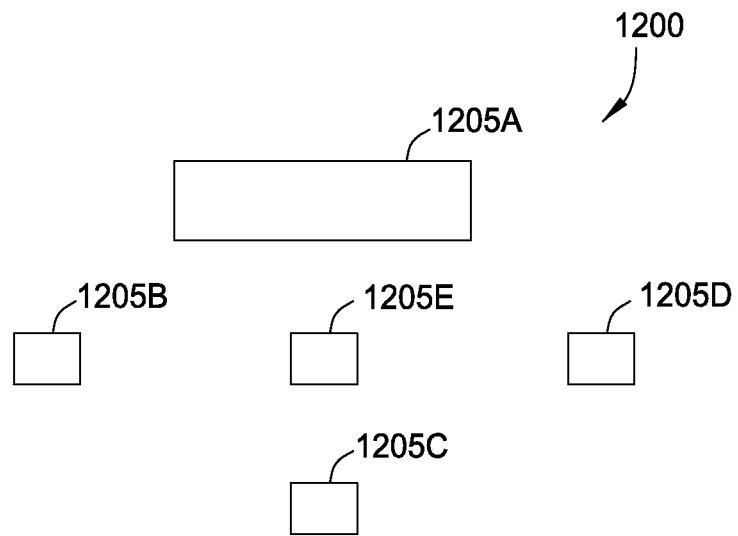

FIGS. 12A-12B illustrate cross-sectional views of the SOI device with the multi-prong embedded waveguide, according to embodiments disclosed herein. As shown in FIG. 12A, the multi-prong adapter 1200 includes five prongs 1205A-E instead of the four prong adapter shown in FIGS. 5A and 5B. Here, multi-prong adapter 1200 includes a fifth prong 1205E that is centered in the middle between the four prongs 1205A-D. Adding the fifth prong may further increase the transmission efficiency between the external light source and the embedded waveguide 235. As discussed above, the dimensions of the prongs 1205A-E may be chosen such that the mode of the prong at this interface closely matches the mode of the external device to which light is to be coupled to or from. In one embodiment, the spacing between the middle prong 1205E and the surrounding prongs 1205A-D may be approximately 1 micron.

FIG. 12A may be a cross-section of the prong adapter 1200 near the coupling interface of the SOI device while FIG. 12B illustrates a cross-section of the adapter 1200 further away or recessed from this interface. Thus, FIG. 12B shows that as the multi-prong adapter 1200 is recessed away from the coupling interface, the width of the prongs 1205B-E reduces while the width of prong 1205A, which is closest to the interface between the insulation layer and surface layer, increases. That is, the fifth prong 1205E may also taper in a similar way as prongs 1205B-D such as to adiabatically transfer the optical energy in a mode confined by all five prongs at the coupling interface to a mode predominantly confined in prong 1205A as the waveguide adapter extends away from the coupling interfaces. However, the opposite is also true. That is, tapering the widths also enables a signal introduced in the upper prong 1205A to be transferred to a mode confined by prongs 1205A-E as the optical signal propagates towards the coupling interface.

In the embodiments described above, the four-prong adapter shown in FIGS. 5A and 5B may be replaced by the five-prong adapter 1200 shown in FIGS. 12A and 12B and still maintain the functionality and advantages described herein.

Conclusion

The embodiments discussed above disclose a SOI device that may include a waveguide adapter that couples an external light source—e.g., a fiber optic cable or laser—to a silicon waveguide on a surface layer of the SOI device. The waveguide adapter may improve transmission efficiency relative to directly coupling the light source to the waveguide. In one embodiment, the waveguide adapter may also be located on the same surface layer as the waveguide. However, fabricating the waveguide adapter on the surface layer of the SOI device may impose constraints on the techniques and materials that are used to form the waveguide adapter. For example, many of the components in the surface layer may be sensitive to temperature. This constraint may limit the fabrication steps used to form the waveguide adapter to low-temperature process steps.

Instead, in one embodiment, the waveguide adapter is embedded into the insulation layer of the SOI device. Doing so may enable the waveguide adapter to be formed before the surface layer components are added to the SOI device. Accordingly, fabrication techniques that use high-temperatures may be used to form the waveguide adapter without harming other components in the SOI device—e.g., the waveguide adapter is formed before heat-sensitive components are added to the silicon surface layer. In one embodiment, the adapter may be disposed on the SOI device when the device only includes a semiconductor substrate and an insulation layer. After the waveguide adapter is embedded into the insulation layer, the silicon surface layer may be added onto the insulation layer to form a SOI structure.

The flowchart and block diagrams in the Figures illustrate the architecture, functionality and operation of possible implementations of systems, methods and according to various embodiments. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:

1. A method comprising:
   forming a first waveguide in an insulation layer of an optical device, wherein the first waveguide comprises a waveguide adapter in the insulation layer, the waveguide adapter comprising multiple prongs exposed at an external coupling surface of the optical device, the external coupling surface is configured to couple to an external light source;
   after forming the first waveguide, disposing a crystalline semiconductor layer on the insulation layer; and
   forming a second waveguide in the semiconductor layer, wherein the second waveguide at least partially overlaps the first waveguide in the insulation layer.

2. The method of claim 1, wherein the waveguide adapter comprises a first prong that is disposed above a second prong in the insulation layer relative to a substrate on which the insulation layer is disposed, and wherein a dimension of the second prong decreases as the second prong extends away from the external coupling surface and a dimension of the first prong increases as the first prong extends away from the external coupling surface.

3. The method of claim 1, further comprising:
   forming a substrate on which the insulation layer is disposed of the optical device to include a groove configured to passively align the external light source at the external coupling surface to introduce light into the multiple prongs of the waveguide adapter.

4. The method of claim 1, wherein the first and second waveguides are spaced apart no more than 500 nanometers where the first and second waveguides overlap.

5. The method of claim 1, wherein the optical device comprises a silicon-on-insulator structure, wherein a substrate on which the insulation layer is disposed is crystalline silicon, the insulation layer is silicon type insulator, and the semiconductor layer is crystalline silicon, and
   wherein the first waveguide comprises one of silicon oxynitride and silicon nitride and the second waveguide comprises crystalline silicon.

6. A method comprising:
   forming a first waveguide in an insulation layer of an optical device;
   after forming the first waveguide, disposing a crystalline semiconductor layer on the insulation layer; and
   forming a second waveguide in the semiconductor layer, wherein the second waveguide at least partially overlaps the first waveguide in the insulation layer, wherein at least a portion of the first waveguide and a portion of the second waveguide are tapered where the first and second waveguides overlap in the optical device.

7. A method comprising:
   forming a first waveguide in an insulation layer of an optical device, wherein the insulation layer completely surrounds the first waveguide;
   after forming the first waveguide, disposing a crystalline semiconductor layer on the insulation layer; and
   forming a second waveguide in the semiconductor layer, wherein the second waveguide at least partially overlaps the first waveguide in the insulation layer.

* * * * *